US010938924B1

(12) United States Patent
Jensen et al.

(10) Patent No.: US 10,938,924 B1
(45) Date of Patent: Mar. 2, 2021

(54) SYSTEMS AND METHODS RELATED TO EXECUTING TRANSACTIONS IN A HYBRID CLOUD ENVIRONMENT

(71) Applicant: Aetna Inc., Hartford, CT (US)

(72) Inventors: Claus T. Jensen, Pawling, NY (US); Robert Bachmann, Newington, CT (US); Stephen Howard Davis, Collegeville, PA (US)

(73) Assignee: Aetna Inc., Hartford, CT (US)

( * ) Notice: Subject to any disclaimer, the term of this patent is extended or adjusted under 35 U.S.C. 154(b) by 0 days.

(21) Appl. No.: 16/673,457

(22) Filed: Nov. 4, 2019

(51) Int. Cl.
*H04L 12/24* (2006.01)
*H04L 29/08* (2006.01)

(52) U.S. Cl.
CPC .......... *H04L 67/16* (2013.01); *H04L 41/5041* (2013.01); *H04L 41/5096* (2013.01); *H04L 67/10* (2013.01)

(58) Field of Classification Search
None
See application file for complete search history.

(56) References Cited

U.S. PATENT DOCUMENTS

| 2016/0036790 A1* | 2/2016 | Shastry | H04L 63/0876 713/168 |
| 2016/0124742 A1* | 5/2016 | Rangasamy | H04L 41/00 717/103 |
| 2019/0273746 A1* | 9/2019 | Coffing | H04L 63/105 |
| 2020/0252451 A1* | 8/2020 | Nandavar | H04L 67/16 |

OTHER PUBLICATIONS

Jensen, Claus T. "The Hybrid Cloud Journey," *The Hybrid Cloud Journey for Dummies, CVS Health Special Edition*, published by John Wiley & Sons, Inc. (May 7, 2019).

* cited by examiner

*Primary Examiner* — James A Edwards
(74) *Attorney, Agent, or Firm* — Leydig, Voit & Mayer, Ltd.

(57) ABSTRACT

Disclosed is a hybrid cloud control plane (HCCP) that manages hybrid cloud workloads. For example, the HCCP manages workloads across public and private cloud data centers and on-premise data centers. The HCCP can leverage a Global ID (global identifier) to create a global trace across the hybrid cloud ecosystem. Also discloses is a "hybrid cloud connected" capability. In one embodiment, a hybrid cloud connected capability comprises of a global identity, a hybrid cloud network connection, and a managed API (application programming interface) used to seamlessly perform transactions in a hybrid cloud environment.

18 Claims, 12 Drawing Sheets

SYSTEMS AND METHODS RELATED TO EXECUTING TRANSACTIONS IN A HYBRID CLOUD ENVIRONMENT

BACKGROUND

Cloud-based applications or services are deployed for a variety of tasks. In some implementations, service providers manage servers that run services or rent network resources from cloud service providers to run the services. An organizations may utilize a private cloud that is restricted to be used internally among the organization's clients, or an organization may utilize a public cloud that exposes services to external clients through a wide area network (WAN), such as the Internet. Further, an organization may have "on-premise" data center that is not "in the cloud," i.e., accessible via internal connections.

Although relying on public cloud providers is popular for development teams looking to reduce dependence on the internal infrastructure teams, nothing requires cloud services to be hosted in such public environments. Public cloud and private cloud have often been discussed as a choice between alternatives. The reality is that for complex enterprises it is not an "either or" decision; instead, the need is to seamlessly blend services from any hosting model: public cloud, private cloud, on-premise, Software as a Service (SaaS), and any other model of interest. This blending of service types is referred to a "hybrid cloud environment."

As the breadth of services available through public clouds and/or private clouds increases and hybrid cloud environments become more common, organizations are able to provide access to various diverse services to build applications with a large amount of functionality. The applications can call services within various data centers in the hybrid cloud environment, e.g., private cloud data centers or public cloud data centers, to perform various tasks. The availability of these services makes deploying new applications easier because developers are not required to write code for performing tasks already handled by existing services.

However, utilizing services via a hybrid cloud architecture can be challenging. Accordingly, there remains a need in the art for a better hybrid cloud architecture.

SUMMARY

One embodiment provides a hybrid cloud control plane for managing workloads in a hybrid cloud. The hybrid cloud control plane includes: a processor configured to: provide access to a first service from a first service provider; and provide access to a second service from a second service provider. The first service corresponds to a first capability for the hybrid cloud from the first service provider, the second service corresponds to a second capability for the hybrid cloud from the second service provider, each of the first service provider and the second service provider comprises a public cloud service provider, a private cloud service provider, or an on-premise service provider, and the first capability is different than the second capability.

Another embodiment provides a method and computer-readable storage medium for performing a transaction in a hybrid cloud system. The method includes: receiving, by an application programming interface (API) gateway associated with a first service provider, a transaction request from a consumer application; calling, by the API gateway, a first application programming interface (API) associated with a first service corresponding to the transaction request, wherein the first API is deployed to the first service provider by an API management platform based on instruction from a hybrid cloud control plane (HCCP); receiving, by the API gateway, a first response from the first service; and sending, by the API gateway, a transaction result to the consumer application based on the first response from the first service.

Yet another embodiment provides a hybrid cloud system comprising one or more Global ID APIs (application programming interfaces) and an API gateway connected to a data center. The one or more Global ID APIs are configured to: receive authentication information from a client device executing a consumer application; authenticate the client device based on the authentication information; in response to authenticating the client device, map the authentication information to a global identity for the client device; and transmit one or more session tokens to the consumer application that include the global identity. The API gateway is configured to: receive a transaction request from the consumer application via a trusted network connection, wherein the transaction request includes the one or more session tokens; interact with the one or more Global ID APIs to map the global identity in the one or more session tokens to a local identity for the client device for use at the data center; and transmit a transaction response to the consumer application via the trusted network connection based on executing one or more services at the data center using the local identity of the client device.

Still another embodiment provides a method for authenticating a client device of a consumer application. The method includes: receiving, by one or more Global ID APIs (application programming interfaces), authentication information from the client device of the consumer application; authenticating, by the one or more Global ID APIs, the client device based on the authentication information; mapping, by the one or more Global ID APIs, the authentication information to a global identity for the client device; and transmitting, by the one or more Global ID APIs, one or more session tokens to the consumer application that include the global identity, wherein the one or more session tokens are used to perform one or more transaction requests with one or more service providers via a trusted network.

Another embodiment provides a method for performing a transaction in a hybrid cloud system. The method includes: receiving, by an API (application programming interface) gateway associated with a service provider, a transaction request from a consumer application via a trusted network connection, wherein the transaction request includes a session token assigned to the transaction request by one or more Global ID APIs, wherein the session token includes a global identifier for a client device of the consumer application; interacting with one or more Global ID APIs to obtain a local identifier for the client device corresponding to the global identifier included in the session token, wherein the local identifier for the client device is used for transactions with a data center connected to the API gateway; causing, by the API gateway, a transaction to be performed by a service of the data center based on the local identity of the client device; and transmitting, by the API gateway, a transaction response from the service to the consumer application.

DETAILED DESCRIPTION

Figure 1:
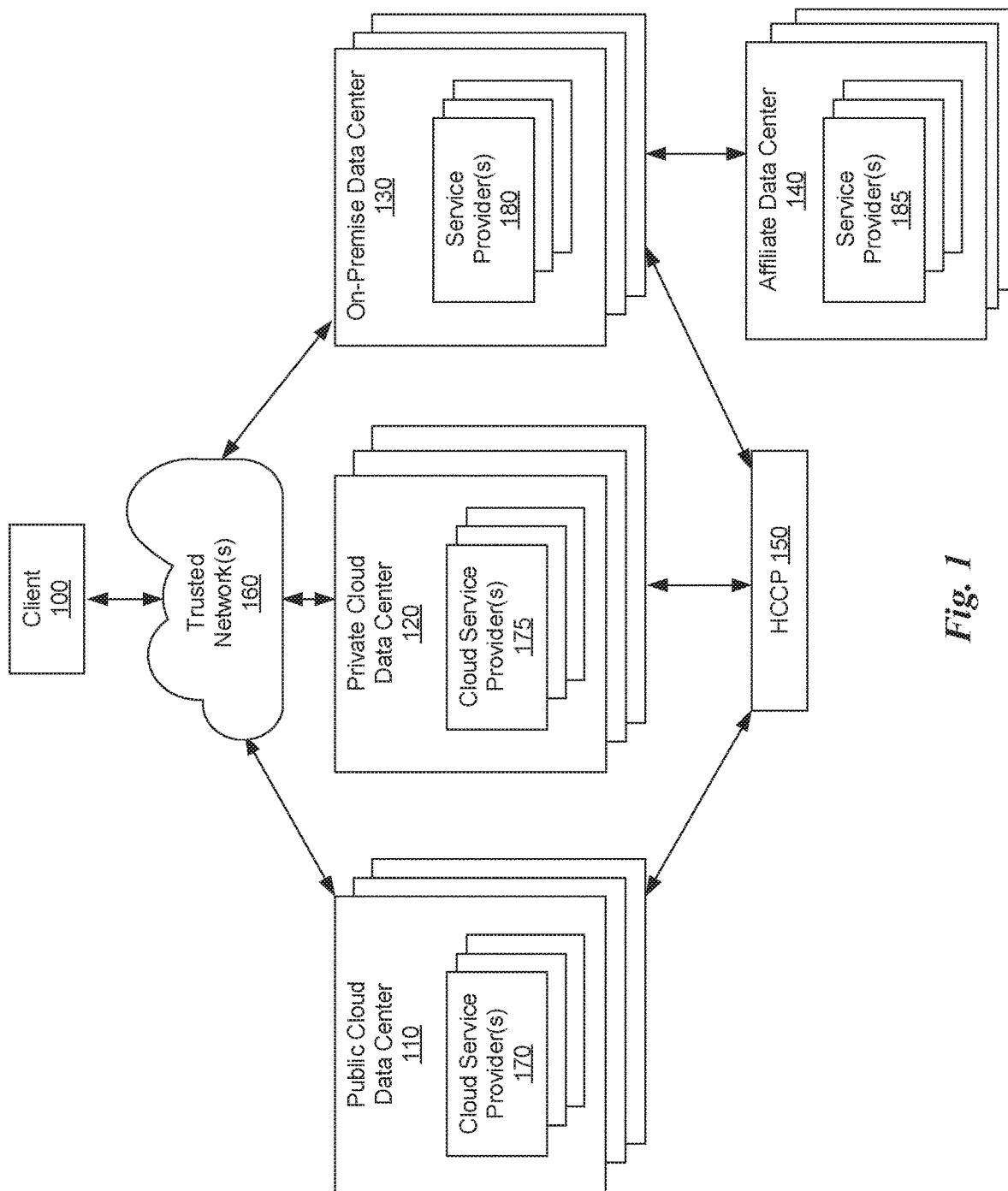
FIG. 1 illustrates a hybrid cloud system, in accordance with some embodiments.

As used herein, a "hybrid cloud" environment is a computerized network environment in which a set of managed services and assets spans an ecosystem of multiple on-premise data centers, private cloud data centers, public cloud data centers, and/or other types of data centers, such as affiliate data centers. The services in a hybrid cloud environment are cataloged for visibility and tracking, regardless of compute location and deployment model. In one example implementation, a hybrid cloud environment can be established by a healthcare organization. Different services may be accessible to the healthcare organization from a wide variety of service providers. Also, data can be stored in various different data stores, as is common with diverse medical data.

In various implementations, the hybrid cloud environment combines and integrates services across different locations, from different owners, and hosted in different compute models. In some implementations, no single cloud service provider will have all the services an enterprise needs to use, and no single hosting model will be appropriate for all workloads. Thus, a hybrid cloud environment may be implemented to take advantage of different services provided by different data centers and compute models.

As discussed in greater detail herein, in some embodiments, a "hybrid cloud control plane" (HCCP) may be implemented to manage the services provided in a hybrid cloud environment. Disclosed is a HCCP that comprises a specialized and purposely combined set of capabilities for operating and managing the data centers and services of a hybrid cloud ecosystem. The HCCP provides a solution to the challenges of operational management in a hybrid cloud environment. In some implementations, the HCCP replaces platform-specific management components with a set of purposely combined and specialized services to consistently manage assets across the hybrid cloud environment. The HCCP shifts the focus from platform-specific capabilities to a focus on business-specific requirements. The HCCP allows applications to be developed from a white-listed service catalog and provides integrated support for security, provisioning, and connectivity requirements. The HCCP ensures that regulatory and other compliance requirements are adhered to by offering services that comply with established and security controls. The HCCP provides self-service that simplifies and accelerates the process of consistently deploying systems with freedom of choice. The HCCP can be leveraged to deliver frictionless services to developers providing integration of core services and connectivity that turns vision into action.

In various embodiments, the HCCP manages hybrid cloud workloads that are comprised of shared capabilities. For example, the HCCP manages workloads across public cloud data centers, private cloud data centers, and on-premise data centers. In one embodiment, the HCCP leverages a Global ID (global identifier) to create a global trace across the hybrid cloud ecosystem. In one embodiment, the HCCP leverages a "hybrid cloud connected" capability, described in greater detail below, to create a global trace across the hybrid cloud ecosystem.

In some implementations, a hybrid cloud device may be considered to have a "hybrid cloud connected" capability. In one embodiment, a hybrid cloud connected capability comprises of a global identity, a hybrid cloud network connection, and a managed API (application programming interface). In one implementation, hybrid cloud connected device leverages three levels of trust to execute a transaction. At a top level, a "trusted user" requests a transaction. In one implementation, the actual identity of the individual or entity that is requesting the transaction is known and verified. At the second level, the individual or entity that is requesting the transaction is verified to be using a "trusted application." The trusted application may be identified as a trading partner by an API management platform. At the third level, the device that executes the transaction is verified to be on a "trusted network." Examples of techniques to verify that the device is on a trusted network include verifying what machine is executing the code, where it resides, who owns it, is it a trusted member of the network, and does the device meet security control requirements, for example. In one embodiment, the hybrid cloud environment includes network connections managed through a hybrid cloud network broker. In one embodiment, the APIs are managed by a hybrid cloud API management platform.

Turning to the drawings, FIG. 1 illustrates a hybrid cloud system, in accordance with some embodiments. As shown in FIG. 1, the hybrid system includes public cloud data centers 110, private cloud data centers 120, and on-premise data centers 130. As used herein, a public cloud data center 110 refers to a data center that provides a set of cloud-based services accessible to the public, and a private cloud data center 120 refers to a data center that provides a set of cloud-based services that is hosted on an intranet or secure behind a firewall to restrict access to devices attached to the intranet. The on-premise data centers 130 is owned and managed by the organization on-site and can host either a private cloud or a public cloud managed by the organization.

The data centers 110, 120, 130 are connected to one another and to a client 100 via one or more trusted networks 160. In some implementations, the data centers 110, 120, 130 may be connected directly to one another through direct connections. Also as shown, the on-premise data centers 130 may be connected to affiliate data centers 140.

As shown in FIG. 1, within each category of data center (i.e., public cloud data centers 110, private cloud data centers 120, on-premise data centers 130, and affiliate data centers 140) there may be located one or more service providers. As shown, the public cloud data centers 110 include one or more cloud service providers 170, the private cloud data centers 120 include one or more cloud service providers 175, the on-premise data centers 130 include one or more service providers 180, and the affiliate data centers 140 include one or more service providers 185. In various implementations, a service provider may be a cloud-based service provider (such as, for example, cloud service providers 170, 175) or may be a non-cloud based service provider (such as, for example, service providers 180, 185). Each of the service providers 170, 175, 180, 185 may host one or more services that are accessible to one or more clients 100.

A hybrid cloud control plane (HCCP) 150 is communicatively coupled to the data centers 110, 120, 130. In various implementations, each data center and/or service provider may be communicatively coupled to an API gateway that executes one or more APIs to access one or more services provided by the data center and/or service provider. Also, in various implementations, the HCCP 150 is also communicatively coupled to the API gateways corresponding to a respective data center and/or service provider. In one implementation, the API gateways are included in the data centers; whereas, in another embodiment, the API gateways are separate entities executed on separate computing devices than the data centers.

As discussed in greater detail below, the HCCP 150 comprises a specialized and purposely combined set of capabilities for operating and managing the services provided by the hybrid cloud ecosystem. The HCCP 150 provides a solution to the challenges of operational management in a hybrid cloud environment. In some implementations, the HCCP 150 replaces platform-specific management components with a set of purposely combined and specialized services to consistently manage all assets across the hybrid cloud environment.

Figure 2:
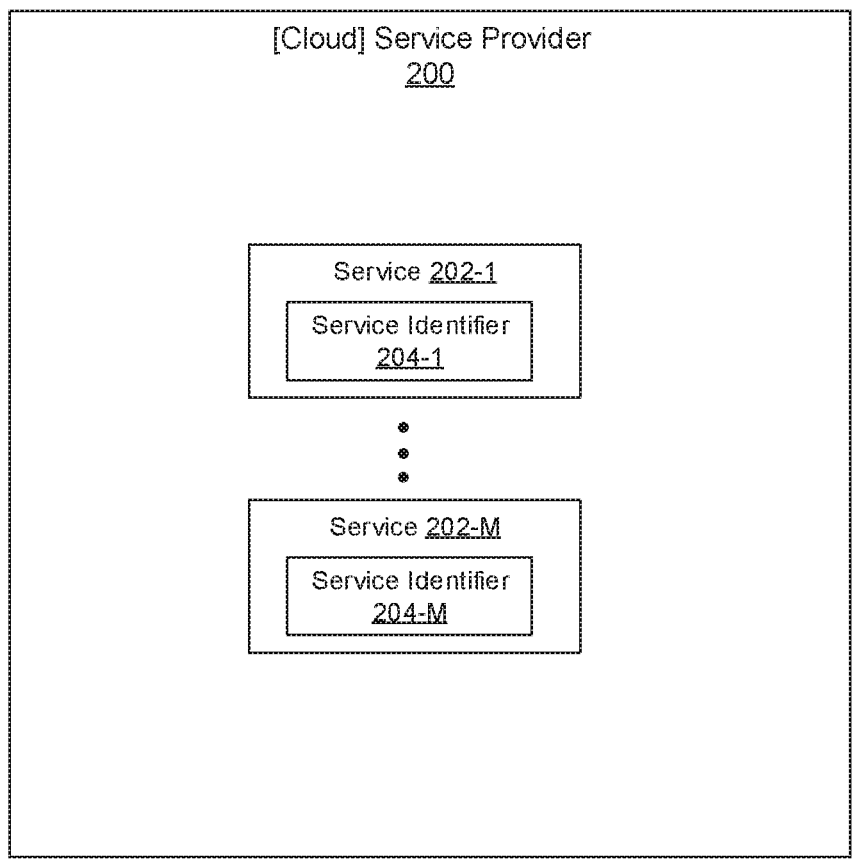
FIG. 2 is a block diagram of a service provider, in accordance with some embodiments.

FIG. 2 is a block diagram of a service provider 200, in accordance with some embodiments. In various implementations, the service provider 200 may be a cloud-based service provider (such as, for example, cloud service providers 170, 175 in FIG. 1) or may be a non-cloud based service provider (such as, for example, service providers 180, 185 in FIG. 1). The service provider 200 provides access to one or more services 202-1 to 202-M to be access by a client computing device, such as a client computing device executing a consumer application. Each of the one or more services 202-1 to 202-M may correspond to a service identifier 204-1 to 204-M, respectively. The one or more services 202-1 to 202-M can be called upon to perform a transaction at the request of the client.

Figure 3:
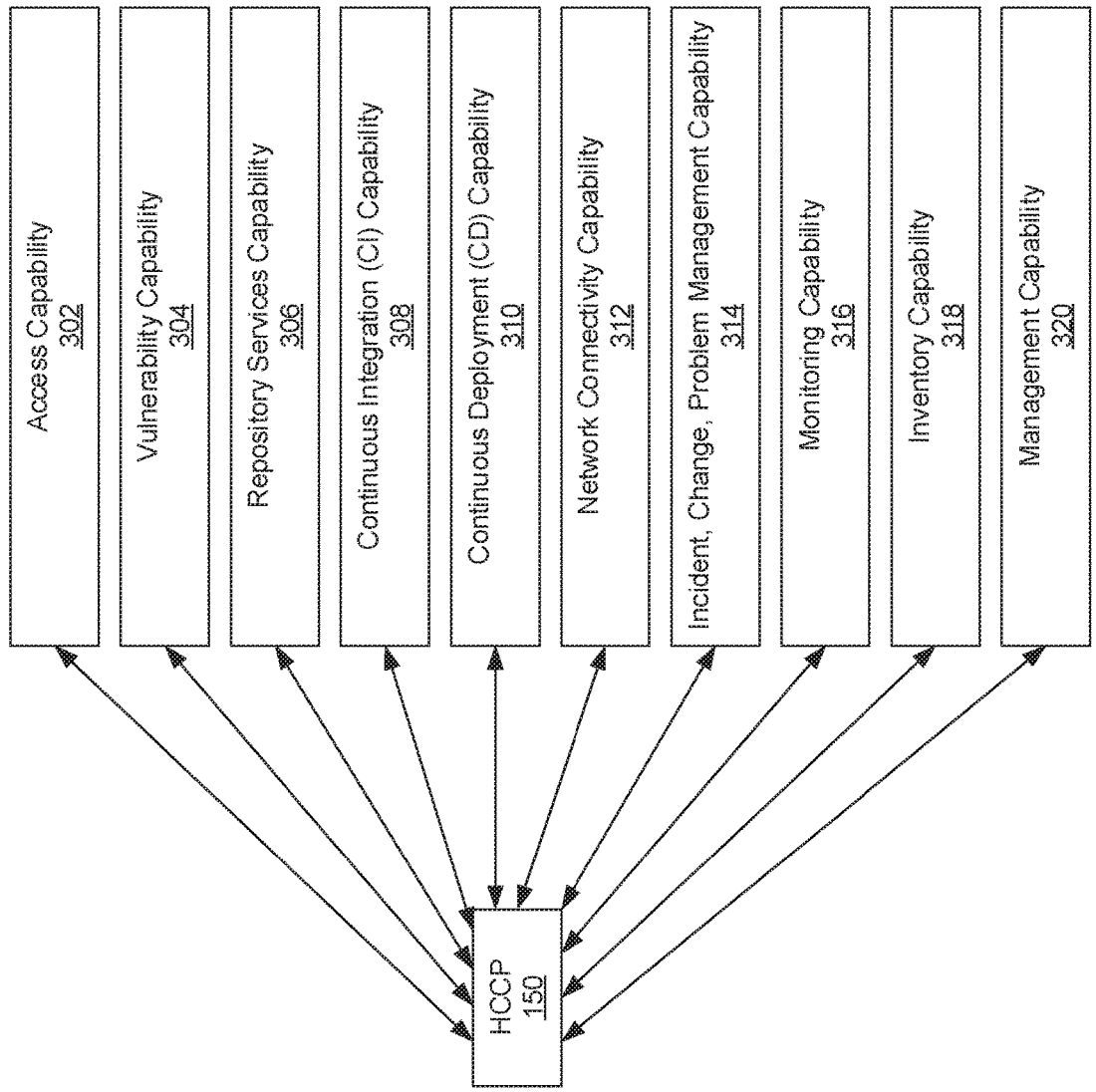
FIG. 3 is a block diagram illustrating capabilities of a hybrid cloud control plane, in accordance with some embodiments.

FIG. 3 is a block diagram illustrating capabilities of a hybrid cloud control plane (HCCP) 150, in accordance with some embodiments. From the perspective of an enterprise that uses a hybrid cloud, managing a hybrid cloud environment has several dimensions and involves more than managing the developer experience. In some implementations, unseen by the developers and unnoticed by the end-users (e.g., clients) is the significantly larger task of managing the hybrid cloud ecosystem. As disclosed herein, the HCCP 150 addresses five concerns of managing the hybrid cloud ecosystem: (1) managing deployment, (2) managing connectivity, (3) managing security, (4) managing IT (information technology) operations, and (5) managing problems.

In some implementations, an organization that uses a hybrid cloud is able to change the management controls without having to change and redeploy the HCCP 150 itself. In other words, the controls are policy-driven, with independently managed policies defining the business and IT operational intent and the runtime of the HCCP 150 enforcing that intent. Examples of common policies are the level of security required and the amount of traffic allowed to specific service providers and/or services.

FIG. 3 illustrates some capabilities that are provided by the HCCP 150. Each of these capabilities is helpful to achieving cohesive management across the hybrid cloud ecosystem. In some implementations, each capability is "omni-tenancy" enabled. As used herein, "omni-tenancy" refers to when each tenant is managed independently, but through the shared platform infrastructure and middleware all tenants have the ability to integrate software and processes with full data and interaction continuation.

The HCCP 150 may be considered middleware, i.e., something to build once and use globally. The HCCP 150 is pervasive throughout the hybrid cloud environment, yet non-intrusive. The term middleware has traditionally been used for software sitting between the operating platform and applications, and is used for accelerating application development or optimizing IT operations. With the emergence of software-defined infrastructure as a key component of hybrid cloud environments, and with DevSecOps as a necessity for development teams, the use cases for middleware expand further into the infrastructure and development spaces. "DevSecOps" refers to automating core security tasks by embedding security controls and processes into the DevOps workflow. "DevOps" is a software engineering culture and practice that aims at unifying software development and software operation. In some implementations, DevSecOps originally focused primarily on automating code security and testing, but now it also encompasses more operations-centric controls.

Each of the capabilities shown in FIG. 3 is described below. It should be understood that the disclosed HCCP 150 may have fewer or more capabilities than what is shown in FIG. 3 in a given implementation. The capabilities shown in FIG. 3 may be embodied in one or more services provided by the service providers of the hybrid cloud.

The access capability 302 includes consistent provisioning of developer and infrastructure accounts across hybrid cloud compute environments. Access functionality is typically provided by identity and access management middleware.

The vulnerability management capability 304 includes identifying, classifying, remediating, and mitigating software and operating system vulnerabilities. Vulnerability management functionality is typically provided by a combination of partners, security middleware, and automated patching middleware.

The repository services capability 306 includes centralized source code management. Source code management systems (e.g., commercial, GitHub, or others) provide this capability, yet usually only in the form of a single physical repository. For use in a hybrid cloud, the relevant development and deployment tools may plug into that single source code repository.

The continuous integration (CI) capability 308 and continuous deployment (CD) capability 310 allow the HCCP 150 to manage the deployment pipeline without disrupting the desired rapid delivery cycles and are typically provided by DevSecOps middleware. In one implementation, relevant development and deployment tools used across the hybrid cloud may plug into the same centralized delivery pipeline management capability.

The network connectivity capability 312 is the hybrid cloud network backbone. The network connectivity capability 312 standardizes robust network connectivity between all compute centers in the hybrid cloud, to or from the hybrid cloud connected assets. Connectivity for the hybrid cloud network backbone is usually provided by a combination of cloud network brokers and traditional network providers.

The incident, change, and problem management capability 314 allows the HCCP 150 to handle the life cycle of any incident or change in the hybrid cloud ecosystem. These functions are typically provided by incident, change, and problem management middleware, yet dependent on plugging into a global monitoring capability.

The monitoring capability 316 provides monitoring information for both the hybrid cloud fabric and the hybrid cloud platform. Monitoring functionality may be provided through monitoring middleware, however is also may integrate several technologies in order to gain full coverage across all assets and compute centers in the hybrid cloud. These multiple technologies may be used since many public cloud data centers and service providers have their own proprietary approach to monitoring.

The inventory capability 318 is the hybrid cloud "catalog" of services provided by the hybrid cloud.

The hybrid cloud management capability 320 includes self-service provisioning, automated deployment, and management of multi-cloud environments.

Figure 4:
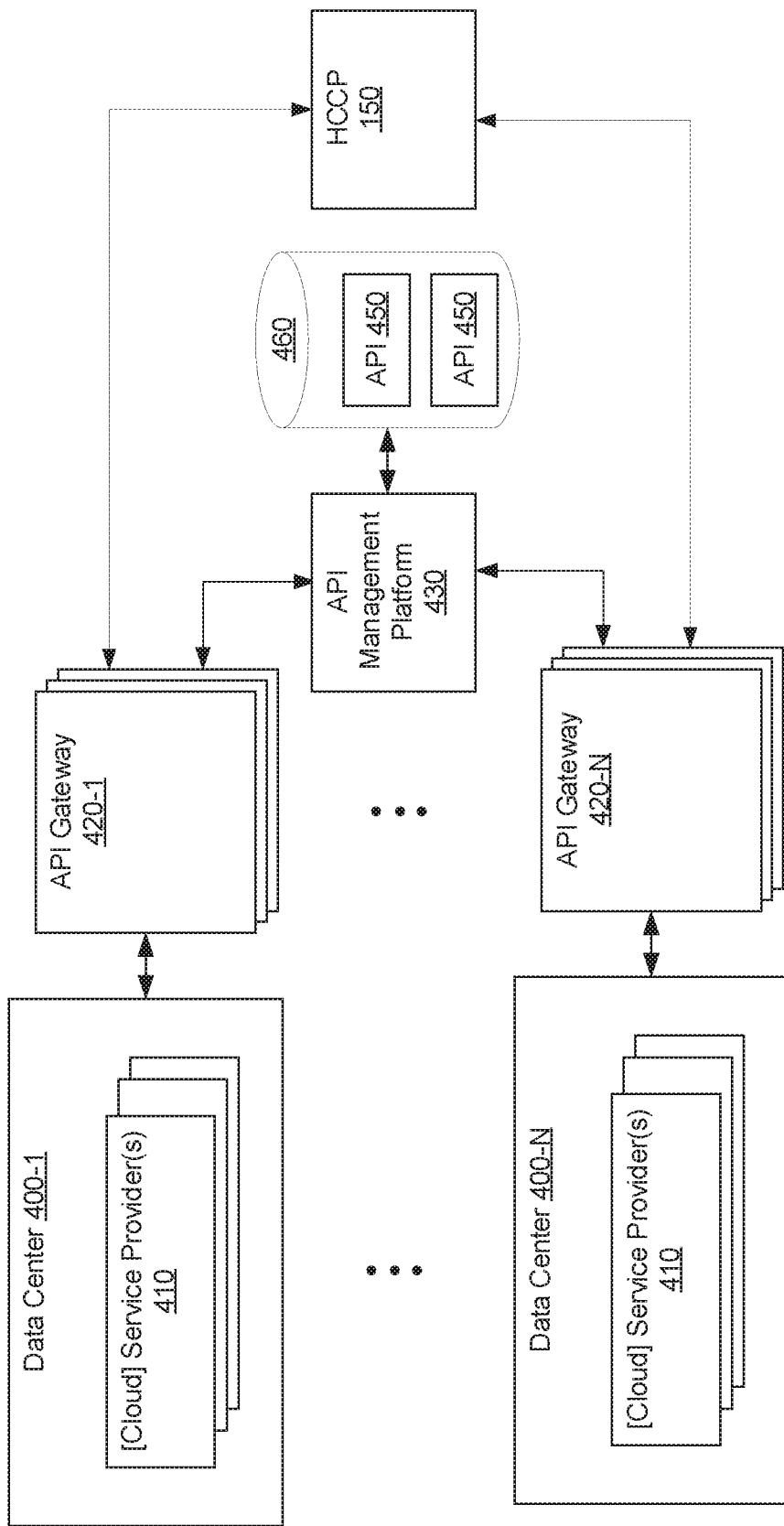
FIG. 4 is a block diagram of a hybrid cloud system including an API (application programming interface) management platform and hybrid cloud control plane (HCCP), in accordance with some embodiments.

FIG. 4 is a block diagram of a hybrid cloud system including an API (application programming interface) management platform 430 and hybrid cloud control plane (HCCP) 150, in accordance with some embodiments.

In various implementations, a hybrid cloud architecture involves a plurality of APIs that are deployed for data centers to provide access to the services of service providers within the data centers. APIs are deployed within the hybrid cloud architecture in order to provide a consistent experience for calling a variety of services or applications within a hybrid cloud. More specifically, a mix of applications or services can be developed internally within an organization or externally by affiliates or third parties to the organization. The organization can define standards for APIs developed for these services that allow for consumer applications to subscribe to or interact with products made available by the organization through the APIs. For example, the organization can enforce naming conventions for the APIs, standard methods implemented by each API, formats for delivering responses by the APIs, and so forth. In addition, the organization can also streamline authentication and authorization procedures that enable a consumer application to efficiently connect with the APIs deployed across many different public or private clouds, both those maintained by the organization and those external to the organization.

In some embodiments, one or more of the public cloud data center 110 or the private cloud data center 120 in FIG. 1 are not hosted in a data center owned by the organization that manages the API management platform 430. For example, the private cloud data center 120 could be maintained and managed by a cloud service provider that leases resources to the organization to run a private cloud for their enterprise services. Similarly, the public cloud data center 110 can be maintained and managed by the same or a separate cloud service provider that leases resources to the organization to run a public cloud that exposes services to external devices.

In some embodiments, APIs are deployed to API gateways 420-1 to 420-N instantiated for each data center 400-1 to 400-N within the hybrid cloud environment, where each data center includes one or more service providers 410. An API management platform 430 can deploy APIs 450 from an API repository 460 to the API gateways 420-1 to 420-N based on instruction from the HCCP 150. In various implementations, an organization can partner with third-parties or affiliates to include their services within a hybrid cloud managed by the organization, even if those services are deployed in a data center external to the organization's data centers.

In one embodiment, one API gateway is provisioned for each service provider 410 in a data center. In another embodiment, a single API gateway is provisioned for two or more service providers 410 in a data center.

In some implementations, FIG. 4 illustrates a system for managing APIs 450 for a plurality of services, in accordance with some embodiments. As depicted in FIG. 4, the system includes an API management platform 430, one or more data centers 400-1 to 400-N, one or more API gateways 420-1 to 420-N, an API repository 460, and a hybrid cloud control plane (HCCP) 150.

The API repository 460 provides storage for a global catalog of APIs 450 managed by an organization and related to applications or back-end services deployed in a hybrid cloud environment. Each data center 400-1 to 400-N can include one or more service providers 410 that are communicatively coupled to an API gateway 420-1 to 420-N. The service providers 410 are configured to execute processes that implement network-based services.

In an embodiment, the API repository 460 also provides storage for products and rate plans. As used herein, a product is a data structure or file that identifies one or more APIs 450 collected into an offering for a consumer application developed by a developer. The product can include a list of APIs 450 for the back-end services or applications, as well as other information, such as information that identifies a space or region where the product is deployed. A "space" refers to a conceptual division of the network into geographical regions that correspond to a set of API gateways deployed to the geographical regions. As used herein, a rate plan is a data structure or file that specifies various parameters that allow a consumer to subscribe to a product. The parameters for a rate plan can include a number of allowed connections between a consumer and a service, a number of service calls permitted per unit of time, which can alternatively be referred to as a rate limit for the product, a price associated with subscribing to the rate plan, as well as any other information related to subscribing to a product.

In an embodiment, an API 450 is a set of instructions configured as a front-end interface for a service or application. The API 450 provides an interface for a separate application to call the service or application corresponding to the API 450. In an embodiment, the API 450 is a web server that implements a HyperText Transfer Protocol (HTTP). The API 450 is configured to receive HTTP or HTTPS requests on a port or ports of a network interface of the network node executing the API 450. In other embodiments, the API 450 can be implemented using another protocol such as User Datagram Protocol (UDP) or Transmission Control Protocol (TCP).

In an embodiment, the API management platform 430 includes a deployment engine and an API portal. The API management platform 430 can be implemented by at least one processor configured to execute instructions that cause the at least one processor to provide the functionality described below. In an embodiment, the deployment engine is configured to deploy instances of the APIs 450, via a network, to API gateways 420-1 to 420-N corresponding to the one or more data centers 400-1 to 400-N. Each API gateway is capable of communicating with a plurality of service providers 410 deployed in the data center 150. In an embodiment, the service providers 410 comprise computer systems, such as server devices included in a rack of the data centers 400-1 to 400-N. In other embodiments, the service providers 410 are virtual machines (VMs) running on one or more server devices and managed by a hypervisor. In yet other embodiments, the service providers 410 are standalone computer systems connected to a local area network (LAN) through a wired connection, such as an Ethernet as defined in the Institute of Electrical and Electronics Engineers (IEEE) 802.3 standards, or a wireless connection, such as a wireless local area network (WLAN) Wi-Fi connection as defined in the IEEE 802.11 standards. In an embodiment, the API gateway is also a network node included in a corresponding data center and can comprise a server or a VM running on a server device.

The API gateways 420-1 to 420-N provide a front-end for consumer applications to call the back-end services running on the service providers 410. It will be appreciated that, in some embodiments, each data center 400-1 to 400-N can include or be connected to at least one network node configured to act as an API gateway. The deployment engine of the API management platform 430 maintains information related to the location of each API gateway and is configured to interact with the API gateways to deploy the APIs 450 from the API repository 460.

In some embodiments, the deployment engine of the API management platform 430 is configured to dynamically instantiate new API gateways, as needed, to handle dynamic loads related to API calls. For example, when a number of API calls received at a particular API gateway is above a threshold value for a given amount of time, then the deployment engine of the API management platform 430 can be configured to create a new instance of an API gateway for the corresponding data center. Similarly, if the number of API calls received within an amount of time drops below a threshold value, then the deployment engine can determine whether the number of API gateways associated with the data center can be reduced and remove one or more API gateways associated with the data center. In other embodiments, the deployment engine is configured to interact with additional applications or services that monitor network loads and call the deployment engine in order to create or remove API gateways from the network.

In an embodiment, the deployment engine of the API management platform 430 is configured to transmit a copy of a particular API 450 to a corresponding API gateway 420-1 to 420-N. The API gateway 420-1 to 420-N is configured to execute the API 450, which then listens to a port or ports of a network interface of the API gateway for messages that implement API calls for one of the services deployed to a service provider 410 in the data center. The deployment engine can also update network resources to indicate to various applications that the API 450 is actively deployed to the API gateway 420-1 to 420-N. In some embodiments, the deployment engine is configured to deploy APIs 450 to at least two API gateways associated with at least two different geographical regions.

In an embodiment, an organization that develops the APIs 450 is different from an external organization (e.g., third-party developer, affiliate organization, etc.) that develops at least one service provided by the service providers 410. In other words, a developer for the organization that runs the API management platform 430 can develop APIs 450 that are paired with external services developed and/or maintained by a separate entity or developer. The external organization can maintain a data center (e.g., data centers 400-1 to 400-N), for deployment of services, where at least one API gateway 420-1 to 420-N is configured to receive an API 450 from the deployment engine of the API management platform 430 via the network. In an embodiment, the deployment engine maintains a list of all API gateways 420-1 to 420-N within the hybrid cloud environment, which can be updated as API gateways 420-1 to 420-N are brought online by the organization or external organizations that partner with the organization.

In an embodiment, each API 450 is permitted to call services of a service provider 410 within a data center in which the API 450 is deployed. In some embodiments, a first API in a first data center may be prohibited from calling services in other data centers directly. Instead, the first API in the first data center can call a second API in a second data center to call a service of the second data center.

In an embodiment, the API portal of the API management platform 430 is an application, such as a web server, that is configured to interact with client devices, such as client device 100 in FIG. 1. The API portal enables developers to be authenticated using credentials and provides information on products available to the developer to utilize in a consumer application. In other words, the API portal is an application that is configured to authenticate users and provide authenticated users visibility to one or more catalogs of products. Each catalog may be associated with a domain and may include one or more products associated with the domain. An organization can maintain a global catalog that includes catalogs for a plurality of different domains. The API portal can also provide the developer with documentation on the APIs 450 associated with the products.

The HCCP 150 in FIG. 4 may be configured to monitor the traffic of API calls by clients to the service providers 410 (via the API gateways 420-1 to 420-N). As described in detail below, a first API call to a first service of a first service provider via a first API gateway may trigger a signal or message to be sent to the HCCP 150. The signal or message may cause the HCCP 150 issue a second API call API call to a second service of a second service provider via a second API gateway.

Referring to the "capabilities" of the HCCP 150 illustrated in FIG. 3 as example, an API call that calls a "repository services capability" 306 service of a first service provider, may cause the HCCP to draw code from a CI 308 or CD 310 service of a second service provider. Calling the CI 308 or CD 310 service may further cause the HCCP to call a management capability 320 service of yet a third service provider. As another example, a call to a monitoring capability 316 service of one service provider may cause the HCCP to call an "incident, change, problem management capability" 314 service of a different service provider.

Figure 5:
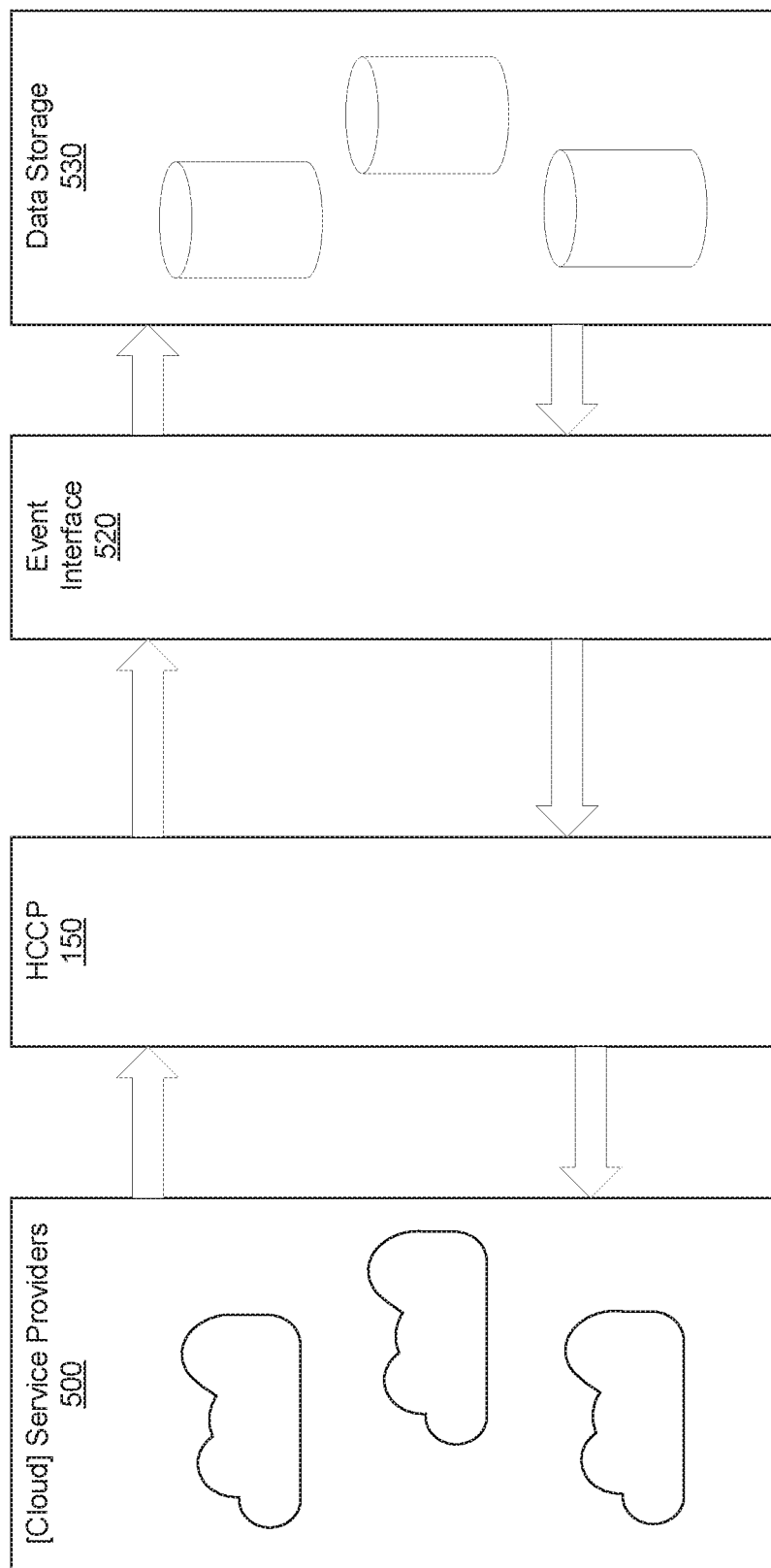
FIG. 5 illustrates a workflow for accessing a data storage, in accordance with some embodiments.

FIG. 5 illustrates a workflow for accessing a data storage 530, in accordance with some embodiments. In one embodiment, a client device can execute a transaction with a service provider 500. The transaction may require data to be read from and/or written to a data storage 520. After receiving the transaction request, the service provider 500 may issue a command to the HCCP 150. The HCCP 150 may use an event interface 520 to interact with the date storage 530. For example, the event interface 520 may be an IDB interface (indexed database interface) or any other interface. The event interface 520 provides an API from the HCCP 150 to access the data storage 530 and return results from the data storage 530 to the HCCP 150. The HCCP 150 can then return data and/or acknowledgement back to the service provider 500. For example, for a read request, the accessed data from the data storage 530 is returned to the service provider 500 by the HCCP 150. For a write request, an ACK (acknowledgement) can be returned to the service provider 500 by the HCCP 150 indicating that the data has been successfully written to the data storage 530. Also, in some embodiments, as discussed in greater detail herein, one service provider performing one transaction against the data storage 520 may automatically cause the HCCP 150 to trigger a second transaction to be performed by a different service provider. The second transaction may be against the same data storage 530 or a different data storage.

Figure 6A:
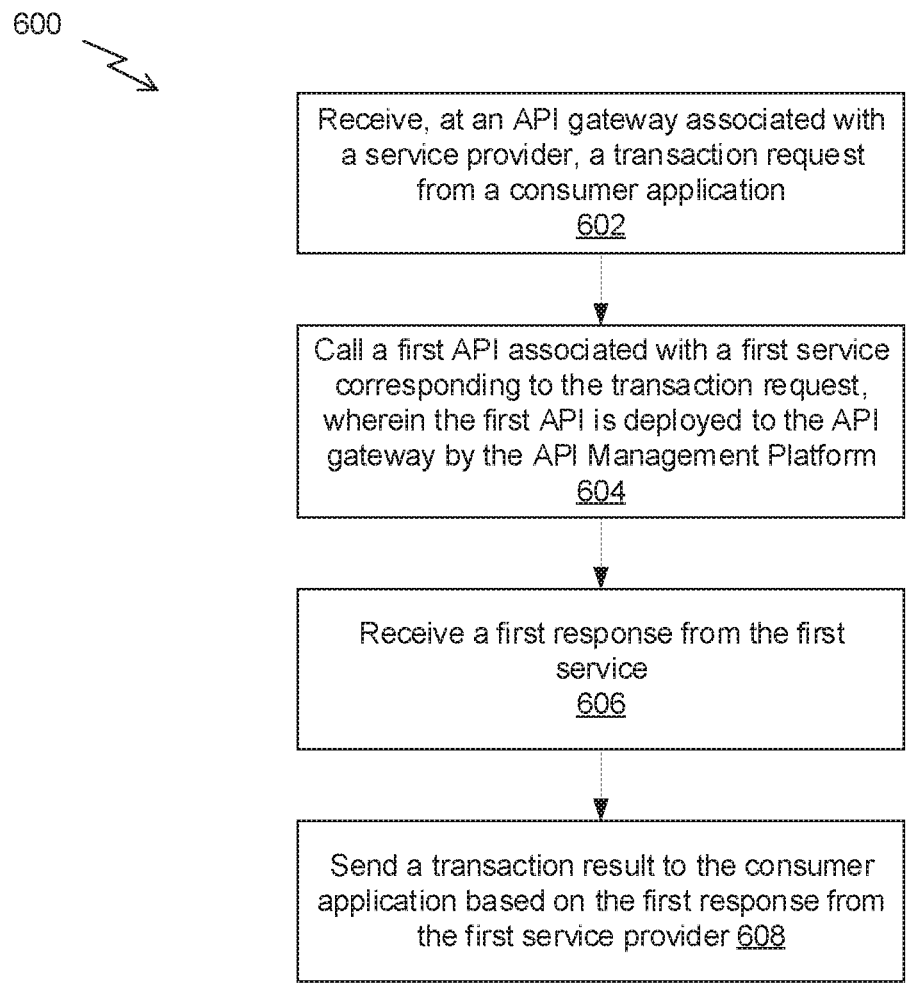
FIG. 6A is a flow diagram of a consumer application transacting with a service provider, in accordance with some embodiments.

FIG. 6A is a flow diagram 600 of a consumer application transacting with a service provider, in accordance with some embodiments. At step 602, an API gateway associated with a service provider, receives a transaction request from a consumer application. For example, the consumer application may be executing on client device 100 in FIG. 1.

A consumer application can be internal (i.e., developed by the organization that manages an API management platform) or external (i.e., developed by a third-party and configured to utilize one or more products exposed through the API management platform). Security can be important to protect the data accessed through the APIs and, therefore, in some embodiments, the consumer application is authenticated each time an API call is made to one of the API gateways, such as the API gateways 420-1 to 420-N in FIG. 4.

At step 604, the API gateway calls a first API associated with a first service corresponding to the transaction request. In one embodiment, the first API is deployed to the API gateway by the API management platform. Executing the first API causes a service provider corresponding to the API gateway to execute a service. The service may involve a lookup or read and/or write transaction to occur against a data storage via a hybrid cloud control plane (HCCP), as shown in FIG. 5.

At step 606, the API gateway receives a first response from the first service of the first service provider. At step 608, the API gateway sends a transaction result to the consumer application based on the first response from the first service provider.

Figure 6B:
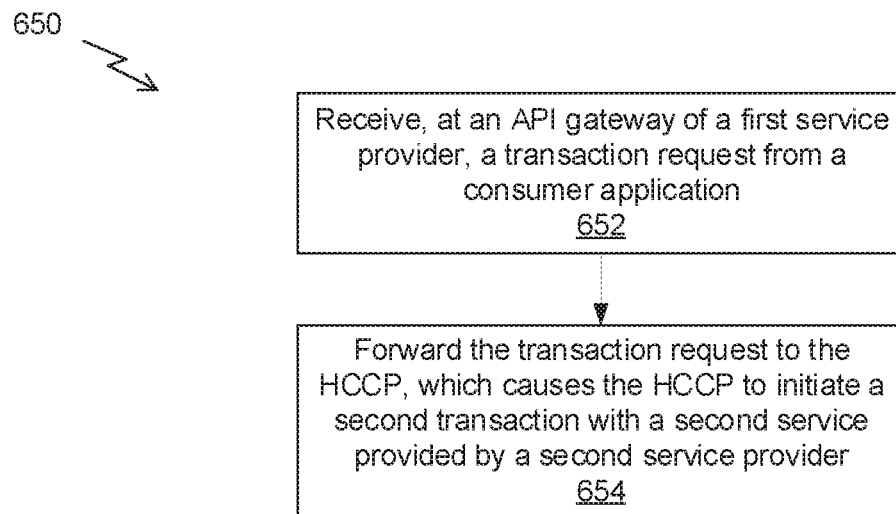
FIG. 6B is a flow diagram of forwarding a transaction to a hybrid cloud control plane (HCCP), in accordance with some embodiments.

As discussed in greater detail herein, one service provider performing one transaction against a data storage may automatically cause the HCCP to trigger a second transaction to be performed by a different service provider. FIG. 6B is a flow diagram 650 of forwarding a transaction to a hybrid cloud control plane (HCCP), in accordance with some embodiments.

At step 652, an API gateway of a first service provider, receives a transaction request from a consumer application. In one embodiment, a first API is deployed to the API gateway by the API management platform. Executing the first API causes a service provider corresponding to the API gateway to execute a first service.

At step 654, the API gateway of the first service provider forwards the transaction request to the HCCP, which causes the HCCP to initiate a second transaction with a second service provided by a second service provider.

Figure 7:
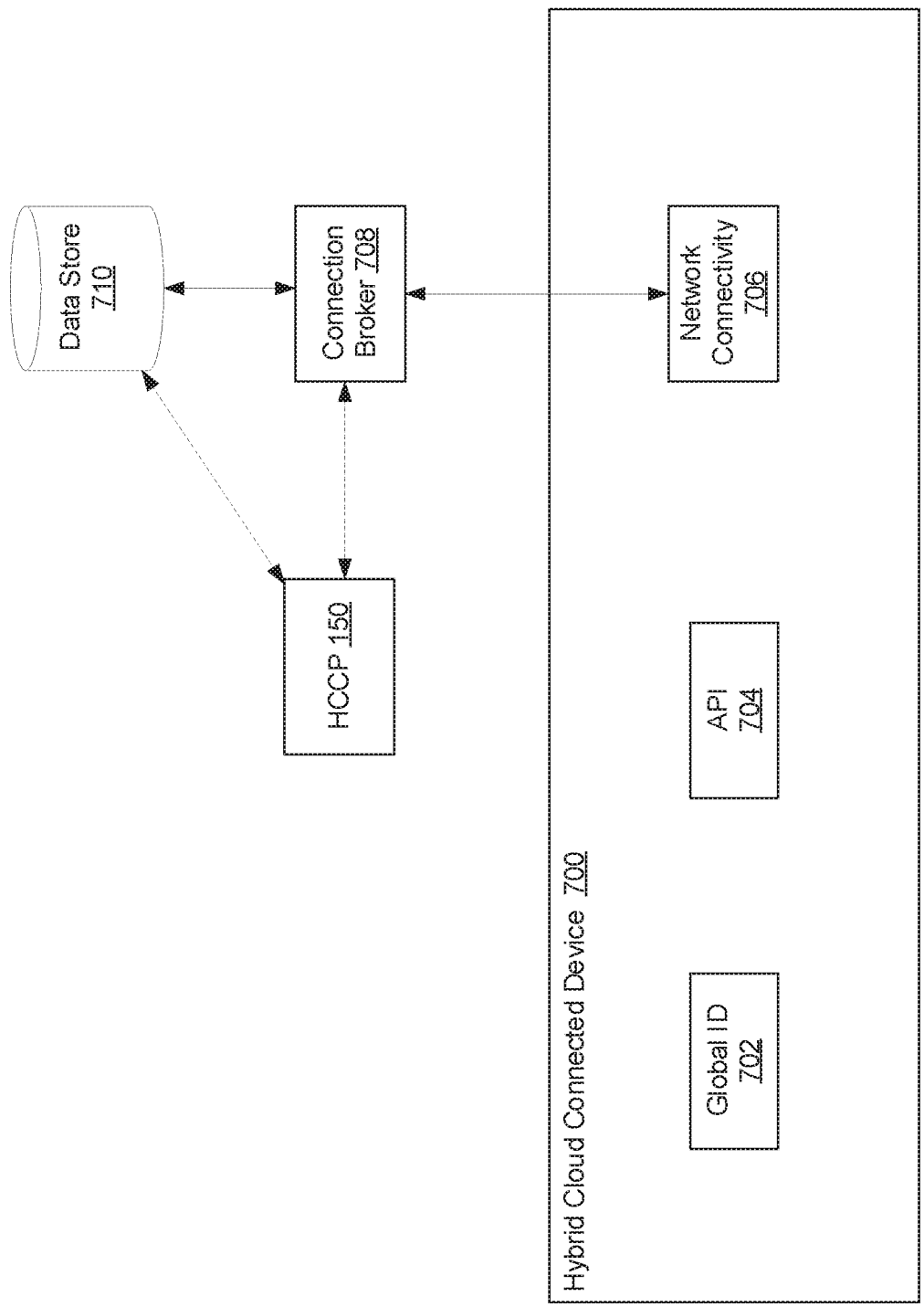
FIG. 7 is a block diagram of a hybrid cloud connected device, in accordance with some embodiments.

FIG. 7 is a block diagram of a hybrid cloud connected device 700, in accordance with some embodiments. The hybrid cloud connected device 700 may be a computing device operated by a service provider of a data center that provides access to one or more services. The hybrid cloud connected device 700 may be associated with various metadata, such as the owner of the hybrid cloud connected device 700, the location of the hybrid cloud connected device 700, which security protocols are implemented by the hybrid cloud connected device 700, among others.

The hybrid cloud connected device 700 includes a global identifier 702 that identifies the hybrid cloud connected device 700 within the hybrid cloud environment. The hybrid cloud connected device 700 also includes one or more APIs 704 for accessing one or more services provided by the hybrid cloud connected device 700.

The hybrid cloud connected device 700 also includes a network connectivity engine 706. The network connectivity engine 706 is configured to interact with a connection broker 708 to access data in a data store 710. A HCCP 150 may also be in communication with the connection broker 708 and/or the data store 710 to monitor transaction occurring with the hybrid cloud connected device 700, including transactions between the hybrid cloud connected device 700 and the data store 710 via the connection broker 708.

In one embodiment, the connection broker 708 is executing on a separate computing device from the HCCP 150. In another embodiment, the connection broker 708 is executing on the same computing device as the HCCP 150.

Figure 8:
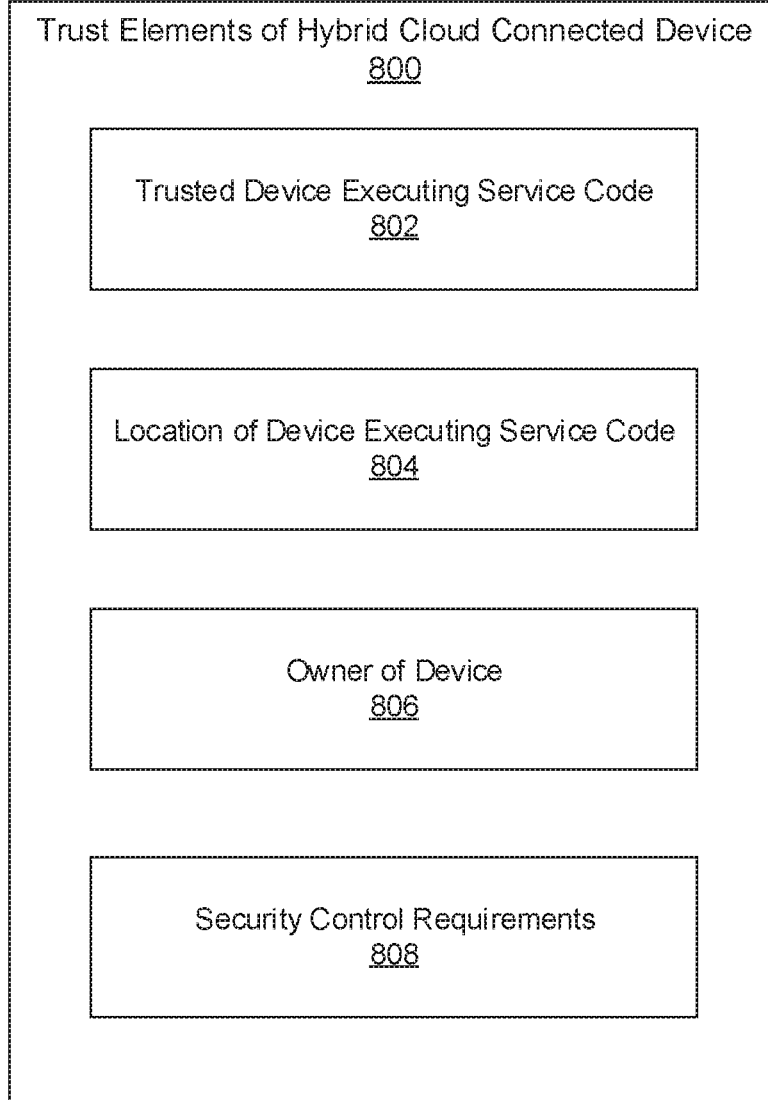
FIG. 8 is a block diagram illustrating trust elements of a hybrid cloud connected device, in accordance with some embodiments.

FIG. 8 is a block diagram illustrating trust elements 800 of a hybrid cloud connected device, in accordance with some embodiments. Examples of trust elements include data indicating that the device executing the service code is a trusted device 802, data indicating that the location of the device executing the service code is a trusted location 804 (e.g., geographical location), data indicating that the owner of the device is a trusted owner 806, and/or data indicating that the device executing the service code satisfies security control requirements 808 (e.g., regulatory compliance requirements). In some embodiments, before a transaction is performed by a device, such as the hybrid cloud connected device 700 of FIG. 7, one or more of the trust elements 800 may be verified before proceeding with the transaction. In some implementations, if any of the trust elements is not satisfied, the transaction is denied.

In various embodiments, one or more of the trust elements 802, 804, 806, 808 may be implemented. In some embodiments, less than all of the trust elements 802, 804, 806, 808 may be implemented. In further embodiments, other trust elements not shown in FIG. 8 may also be implemented.

Figure 9:
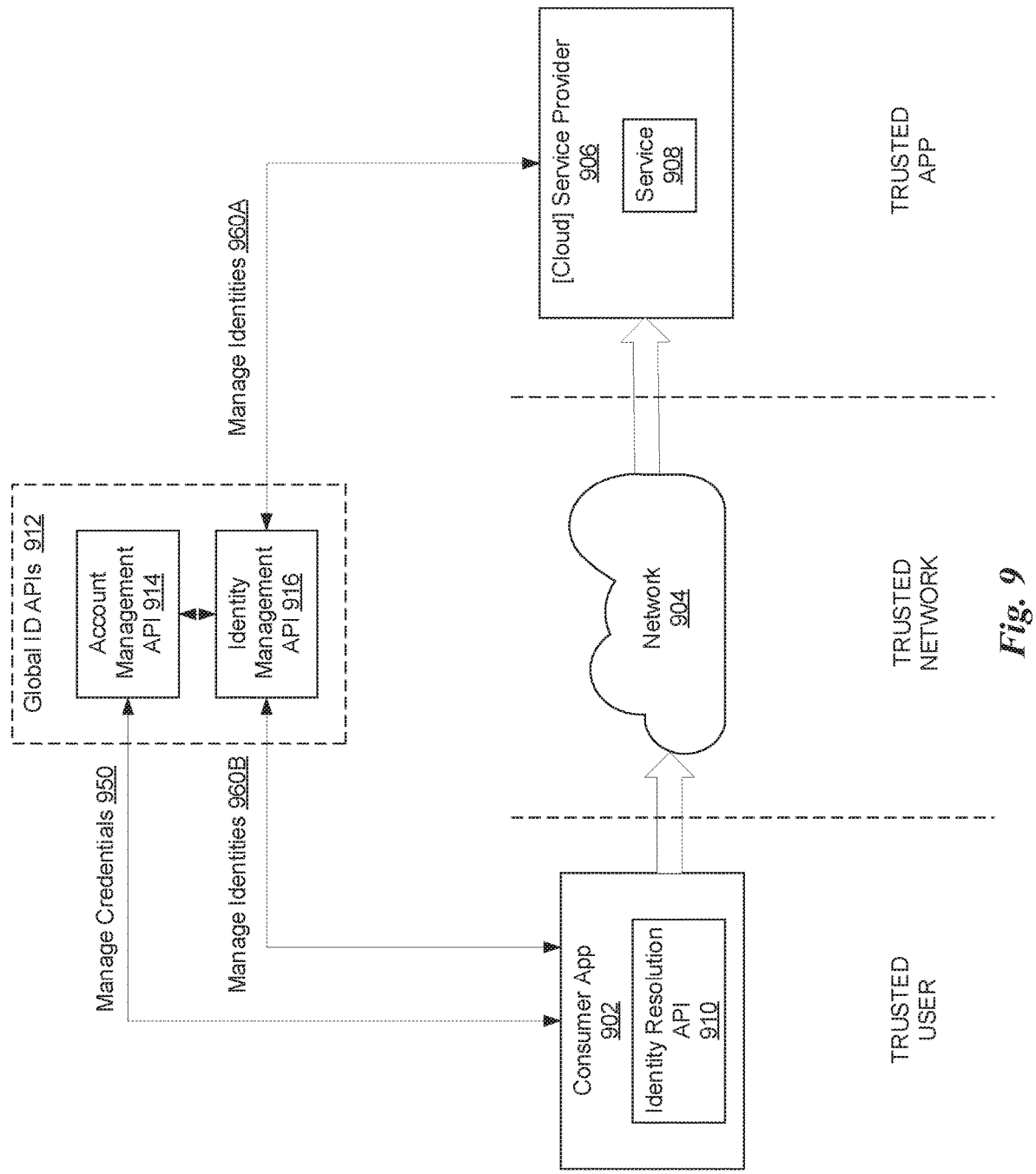
FIG. 9 illustrates managing credentials between a consumer application and a service provider, in accordance with some embodiments.

FIG. 9 illustrates managing credentials between a consumer application 902 and a service provider 906, in accordance with some embodiments. In some embodiments, the service provider 908 may be a cloud service provider. The service provider 906 provides access to one or more services 908.

In one embodiment, the consumer application 902 includes an identity resolution API 910. The identity resolution API 910 receives authentication credentials from a user of the consumer application. For example, the authentication credentials may be a username and password. The identity resolution API 910 then performs "first authentication" 950 to manage credentials between the consumer application 902 and global identity (ID) APIs 912. The global ID APIs include an account management API 914 and an identity management API 916.

In one embodiment, performing the "first authentication" 950 includes the identity resolution API 910 transmitting the authentication credentials provided to the consumer application 902 to the account management API 914. The account management API 914 verifies the authenticity of the authentication credentials. The account management API 914 then maps the authentication credentials to a global identity (ID) for the user that provided the authentication credentials. In another embodiment, the global ID may correspond to the consumer application 902. The account management API 914 then transmits a session token to the consumer application 902. The session token includes the global ID.

The consumer application 902 can then use the session token to perform a transaction with the service 908 provided by the service provider 906 via a network 904. However, before the service can be performed using the session token, "second authentication" should occur. "Second authentication" involves managing identities between the consumer application and the service provider. The "second authentication" includes translating the data included in the session token, including the global ID, to information that is understood by the service provider 906 and/or service 908.

In a first implementation, second authentication 960A is performed between the service provider 906 and the identity management API 916. The service provider 906 receives the session token (including the global ID) from the consumer application 902. The service provider 906 transits the session token to the identity management API 916. The identity management API 916 maps the global identity in the session token to a local identity of the user (or consumer application 902) for the service provider 906. The identity management API 916 then transmits a message to the service provider 908 (via an API gateway) including the local identity in order initiate performing the service 908.

In a second implementation, second authentication 960B is performed between the consumer application 902 and the identity management API 916. Before transmitting the session token to the service provider 906, the consumer application 902 transmits the session token (including the global ID) to the identity management API 916. The identity management API 916 maps the global identity in the session token to a local identity of the user (or consumer application 902) for the service provider 906. The identity management API 916 then transmits a first message to the consumer application 902 including the local identity. The consumer application 902 then transmits a second message (via an API gateway) to the service provider via the network 904, where the second message includes the local identity of the user (or consumer application 902) for the service provider 906 to initiate performing the service 908. In one embodiment, the API gateway for the service provider 906 communicates with the identity management API 916 to obtain the local identity of the user (or consumer application 902) for the service provider 906.

In the embodiment shown in FIG. 9, the account management API 914 and the identity management API 916 may be executing on two different computing devices. The two different computing devices may be physically located in different locations, e.g., different data centers. In other embodiments, the same computing device may execute both the account management API 914 and the identity management API 916. In still further embodiments, the functionality of the account management API 914 and the identity management API 916 may integrated into one API, and not two separate APIs as shown in FIG. 9.

Figure 10:
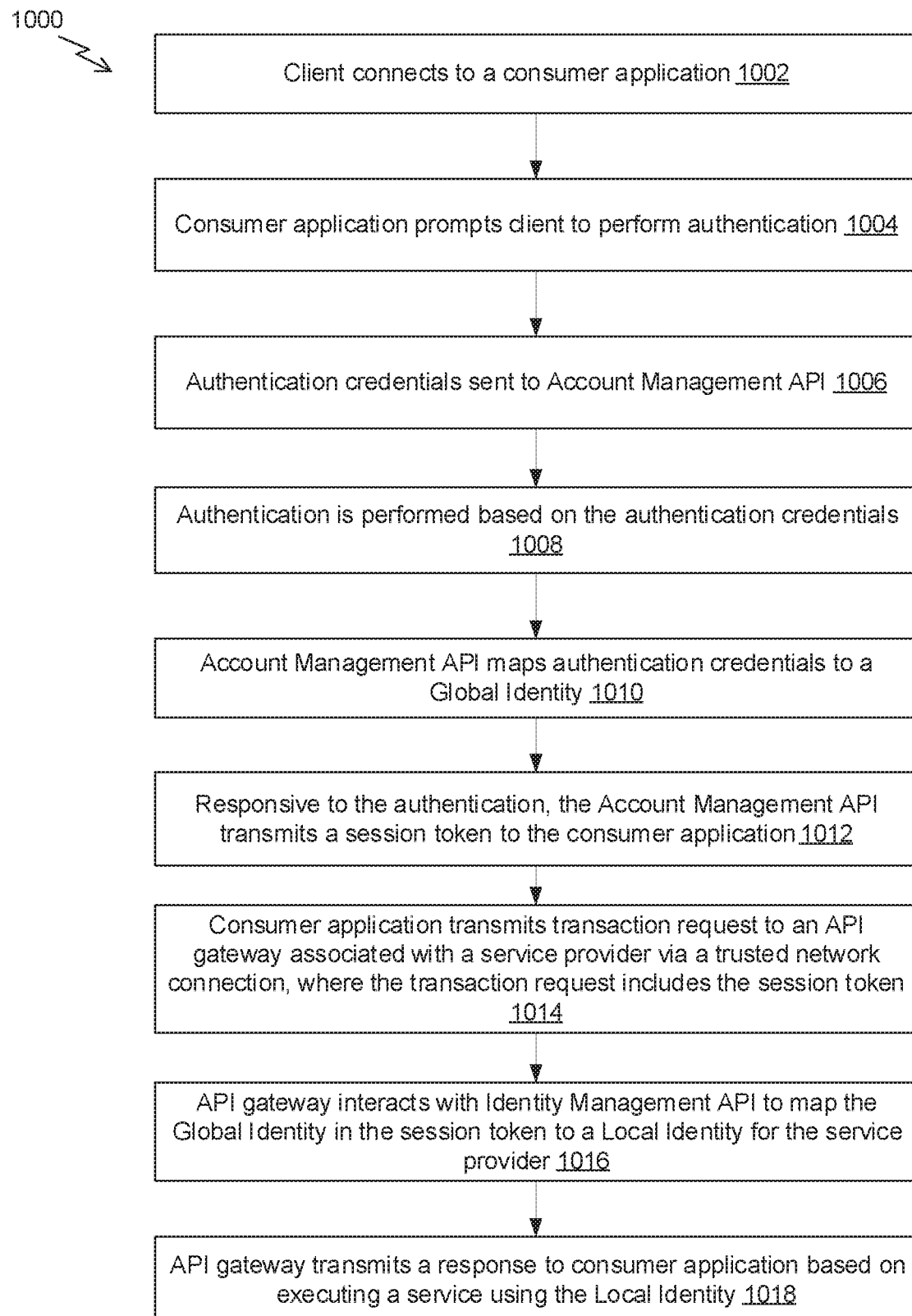
FIG. 10 is a flow diagram of managing credentials between a consumer application and a service provider, in accordance with some embodiments.

FIG. 10 is a flow diagram 1000 of managing credentials between a consumer application and a service provider, in accordance with some embodiments.

At step 1002, a client connects to a consumer application. At step 1004, the consumer application prompts the client to perform authentication. In response, a user may enter authentication credentials into the consumer application via the client.

At step 1006, the authentication credentials are sent to an account management API by the consumer application. At step 1008, authentication is performed between the account management API and the consumer application based on the authentication credentials. At step 1010, an account management API maps authentication credentials to a global identity. At step 1012, responsive to the authentication, the account management API transmits a session token to the consumer application, where the session token includes the global identity.

At step 1014, the consumer application transmits a transaction request to an API gateway associated with a service provider via a trusted network connection, where the transaction request includes the session token. At step 1016, the API gateway interacts with identity management API to map the global identity in the session token to a local identity of the user (or consumer application) for the service provider. In one embodiment, the identity management API 916 transmits a message to the API gateway for the service provider including the local identity of the user (or consumer application) in order initiate performing the service by the service provider.

At step 1018, after the service is performed by the service provider, the API gateway transmits a response to consumer application based on executing the service by the service provider using the local identity.

Figure 11:
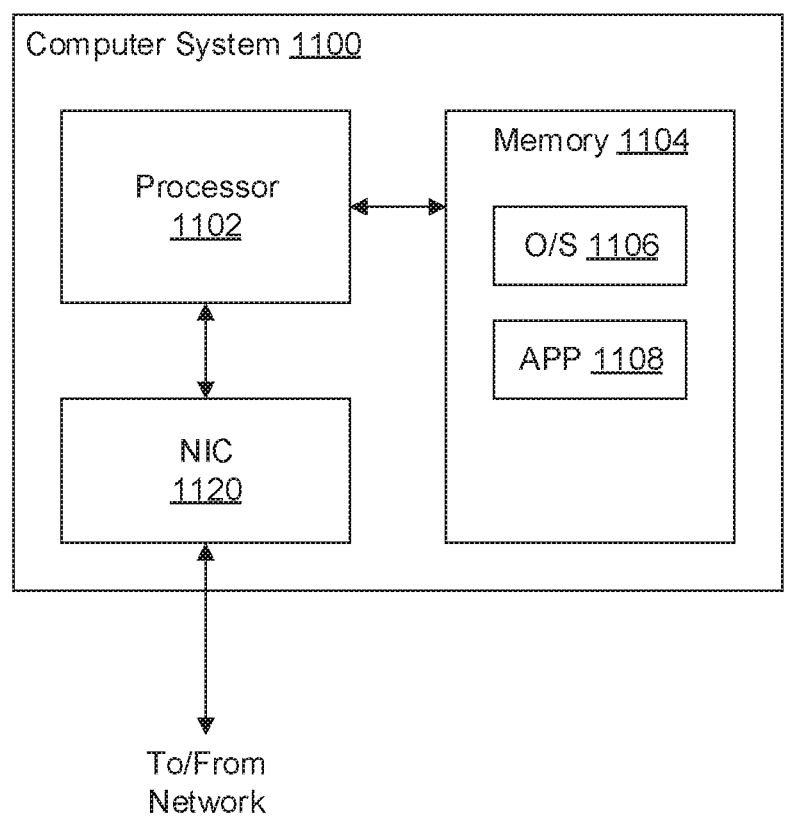
FIG. 11 illustrates an example computer system, in accordance with some embodiments.

FIG. 11 illustrates an example computer system 1100, in accordance with some embodiments. The computer system 1100 includes a processor 1102, a non-volatile memory 1104, and a network interface controller (NIC) 1120. The processor 1102 can execute instructions that cause the computer system 1100 to implement the functionality various elements of the hybrid cloud environment described above. For example, each of the client 100, public cloud data center 110, private cloud data center 120, on-premise data center 130, affiliate data center 140, HCCP 150, API gateways 420-1 to 420-N, and/or API management platform 430 may be implemented as a computer system like the computer system 1100 shown in FIG. 11.

Each of the components 1102, 1104, and 1120 can be interconnected, for example, using a system bus to enable communications between the components. The processor 1102 is capable of processing instructions for execution within the computer system 1100. The processor 1102 can be a single-threaded processor, a multi-threaded processor, a vector processor or parallel processor that implements a single-instruction, multiple data (SIMD) architecture, or the like. The processor 1102 is capable of processing instructions stored in the volatile memory 1104. In some embodiments, the volatile memory 1104 is a dynamic random access memory (DRAM). The instructions can be loaded into the volatile memory 1104 from a non-volatile storage, such as a Hard Disk Drive (HDD) or a solid state drive (not explicitly shown), or received via the network. In an embodiment, the volatile memory 1104 can include instructions for an operating system 1106 as well as one or more applications, such as services (e.g., services 908 in FIG. 9) or APIs (e.g., APIs 450, 910, 914, 916).

The NIC 1120 enables the computer system 1100 to communicate with other devices over a network, including a local area network (LAN) or a wide area network (WAN) such as the Internet.

It will be appreciated that the computer system 1100 is merely one example computer architecture and that the processing devices implemented in the hybrid cloud environment can include various modifications such as additional components in lieu of or in addition to the components shown in FIG. 11. For example, in some embodiments, the computer system 1100 can be implemented as a system-on-chip (SoC) that includes a primary integrated circuit die containing one or more central processing unit (CPU) cores, one or more graphics processing unit (GPU) cores, a memory management unit, analog domain logic and the like coupled to a volatile memory such as one or more synchronous dynamic random access memory (SDRAM) integrated circuit dies stacked on top of the primary integrated circuit dies and connected via wire bonds, micro ball arrays, and the like in a single package (e.g., chip). In another embodiment, the computer system 1100 can be implemented as a server device, which can, in some embodiments, execute a hypervisor and one or more virtual machines that share the hardware resources of the server device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

For situations in which the systems discussed here collect personal information about users, or may make use of personal information, the users may be provided with an opportunity to control whether programs or features collect personal information (e.g., a user's health or medical information, information about a user's social network, social actions or activities, profession, a user's preferences, or a user's location), or to control whether and/or how to retrieve content (i.e., medical records) from a content server (i.e., a medical record database). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A method for performing a transaction in a hybrid cloud system, the method comprising:

receiving, by an application programming interface (API) gateway associated with a first service provider, a transaction request from a consumer application, wherein a first service is associated with the transaction request initiated by the consumer application, and wherein a global identifier is associated with the consumer application;

providing, by the API gateway, the global identifier to a global identity (ID) API to obtain a local identifier for a client device corresponding to the first service, wherein the local identifier for the client device corresponding to the first service is used for transactions with a data center corresponding to the first service provider;

calling, by the API gateway, a first API associated with the first service corresponding to the transaction request using the local identifier for the client device corresponding to the first service, wherein the first API is deployed to the first service provider by an API management platform based on instruction from a hybrid cloud control plane (HCCP);

receiving, by the API gateway, a first response from the first service provider in response to calling the first API;

sending, by the API gateway, a first transaction result to the consumer application based on the first response from the first service provider; and forwarding, by the API gateway, the transaction request from the consumer application to the HCCP, which causes the HCCP to initiate a second transaction request with a second service provided by a second service provider via a second API deployed to the second service provider.

2. The method of claim 1, wherein the first service comprises:
an access capability that includes consistent provisioning of developer and infrastructure accounts across the hybrid cloud system.

3. The method of claim 1, wherein the first service comprises:
a vulnerability management capability that includes identifying, classifying, remediating, and mitigating software and operating system vulnerabilities of the hybrid cloud system.

4. The method of claim 1, wherein the first service comprises:
a repository services capability that includes centralized source code management of the hybrid cloud system.

5. The method of claim 1, wherein the first service comprises:
continuous integration (CI) and continuous deployment (CD) capabilities that allow management of a deployment pipeline of the hybrid cloud system.

6. The method of claim 1, wherein the first service comprises:
a network connectivity capability that standardizes robust network connectivity between different cloud service providers in the hybrid cloud system.

7. The method of claim 1, wherein the first service comprises:
an incident, change, and problem management capability that provides management for a life cycle of any incident or change in the hybrid cloud system.

8. The method of claim 1, wherein the first service comprises:
a monitoring capability that provides monitoring information for the hybrid cloud system.

9. The method of claim 1, wherein the first service comprises:
an inventory capability that provides inventory information for the hybrid cloud system.

10. The method of claim 1, wherein the first service comprises:
a management capability that includes self-service provisioning, automated deployment, and management of multi-cloud environments.

11. The method of claim 1, wherein the first service provider comprises a public cloud service provider, a private cloud service provider, or an on-premise service provider.

12. The method of claim 1, wherein the HCCP determines that the second service provider is a trusted service provider on a trusted network before initiating the second transaction request.

13. The method of claim 1, wherein the HCCP interacts with a data store via an event interface to access data corresponding to the transaction request.

14. The method of claim 1, further comprising:
providing, by the API gateway, the global identifier to the global ID API to obtain a local identifier for a second client device corresponding to the second service, wherein the local identifier for the second client device corresponding to the second service is used for transactions with a second data center corresponding to the second service provider;

calling, by the API gateway, a second API associated with the second service corresponding to the second transaction request using the local identifier for the second client device corresponding to the second service, wherein the second API is deployed to the second service provider by the API management platform based on instruction from the HCCP;

receiving, by the API gateway, a second response from the second service provider in response to calling the second API; and sending, by the API gateway, a second transaction result to the consumer application based on the second response from the second service provider.

15. A non-transitory computer-readable storage medium storing instructions that, when executed by a processor, cause an application programming interface (API) gateway associated with a first service provider to perform a transaction in a hybrid cloud system, by performing steps of:
receiving a transaction request from a consumer application, wherein a first service is associated with the transaction request initiated by the consumer application, and wherein a global identifier is associated with the consumer application;

providing the global identifier to a global identity (ID) API to obtain a local identifier for a client device corresponding to the first service, wherein the local identifier for the client device corresponding to the first service is used for transactions with a data center corresponding to the first service provider;

calling a first API associated with the first service corresponding to the transaction request using the local identifier for the client device corresponding to the first service, wherein the first API is deployed to the first service provider by an API management platform based on instruction from a hybrid cloud control plane (HCCP);

receiving a first response from the first service provider in response to calling the first API;

sending a first transaction result to the consumer application based on the first response from the first service provider; and forwarding the transaction request from the consumer application to the HCCP, which causes the HCCP to initiate a second transaction request with a second service provided by a second service provider via a second API deployed to the second service provider.

16. The computer-readable storage medium of claim 15, wherein the first service provider comprises a public cloud service provider, a private cloud service provider, or an on-premise service provider.

17. The computer-readable storage medium of claim 15, wherein the HCCP determines that the second service provider is a trusted service provider on a trusted network before initiating the second transaction request.

18. The computer-readable storage medium of claim 15, wherein the processor executing the instructions further causes the API gateway to perform the steps of:
providing the global identifier to the global ID API to obtain a local identifier for a second client device corresponding to the second service, wherein the local identifier for the second client device corresponding to the second service is used for transactions with a second data center corresponding to the second service provider;

calling a second API associated with the second service corresponding to the second transaction request using the local identifier for the second client device corresponding to the second service, wherein the second API is deployed to the second service provider by the API management platform based on instruction from the HCCP;

receiving a second response from the second service provider in response to calling the second API; and sending a second transaction result to the consumer application based on the second response from the second service provider.

* * * * *